Nov. 12, 1935.  D. B. LEE  2,020,896
VEHICLE VENTILATING APPARATUS
Filed April 30, 1934   3 Sheets-Sheet 1
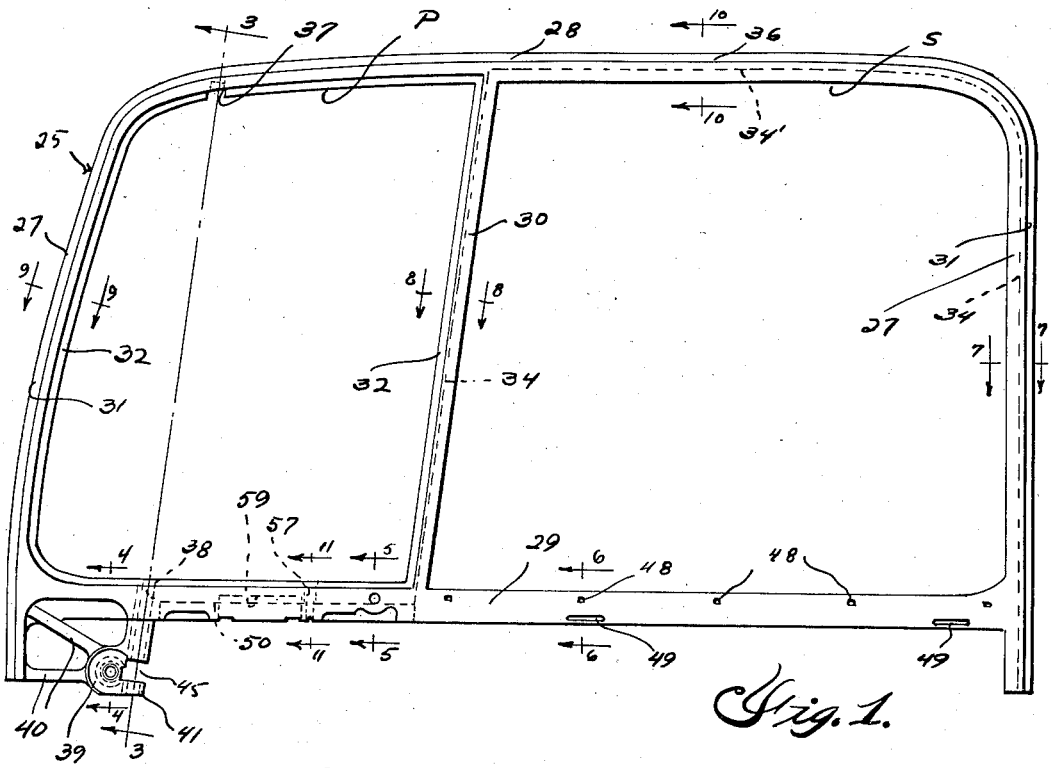

Nov. 12, 1935. D. B. LEE 2,020,896
VEHICLE VENTILATING APPARATUS
Filed April 30, 1934  3 Sheets-Sheet 2

INVENTOR
Dwight B. Lee
BY
ATTORNEYS

Nov. 12, 1935.  D. B. LEE  2,020,896
VEHICLE VENTILATING APPARATUS
Filed April 30, 1934   3 Sheets-Sheet 3

INVENTOR
Dwight B. Lee

BY
ATTORNEYS

Patented Nov. 12, 1935

2,020,896

UNITED STATES PATENT OFFICE 2,020,896

VEHICLE VENTILATING APPARATUS

Dwight B. Lee, Detroit, Mich.

Application April 30, 1934, Serial No. 723,255

2 Claims. (Cl. 296—44)

This invention relates to vehicle ventilating apparatus and more particularly to improvements in that type of ventilating window shown and described in my copending application, Serial No. 691,882.

Ventilating window constructions of the type illustrated in my aforementioned application comprise a composite window including pivoted and sliding panels operable independently of one another in effecting the control of the ventilating window, and also operable as a unit so that they may be simultaneously raised into and lowered from the window opening.

This type of ventilating window construction includes a frame in which the pivoted panel is mounted together with means for raising and lowering the frame together with the pivoted panel into and out of registration with the window opening; the frame being also provided with means operatively associated with the pivoted panel for swinging the pivoted panel about its pivots when the frame has been brought into registration with the window opening.

The pivoted panel is mounted in the frame on up and down or substantially vertically arranged pivots, and the operating mechanism therefor usually includes worm gearing mounted on the frame for movement therewith. Obviously care must be exercised in locating the pivots and the gear elements to insure the proper alignment and relation thereof. This demands a degree of accuracy which is difficult to consistently maintain in mass or quantity production.

It is therefore one of the important objects of this invention to provide a unitary one-piece frame construction wherein the pivots for the pivoted panel, together with the housing or mounting for the operating gearing, may be formed integrally with and properly located with respect to the frame when the same is produced. In accordance with this invention, the frame is preferably although not necessarily produced by die casting.

Another object of the invention is to provide an integral frame construction of the character described in which the necessity for a plurality of welded joints is eliminated, and wherein the necessary varying cross sections incident to the structure are properly produced and located thus minimizing production costs and facilitating assembly.

Many other objects, advantages and novel details of construction of the invention will be made more apparent as this description proceeds, especially when considered in connection with the accompanying drawings, wherein Figure 1 is an elevational view of a frame constructed in accordance with this invention;

Figure 2 is a bottom plan view of the structure illustrated in Figure 1;

Figures 3 to 11 inclusive are enlarged fragmentary sections taken substantially on the planes indicated by lines 3—3, 4—4, 5—5, 6—6, 7—7, 8—8, 9—9, 10—10 and 11—11 respectively of Figure 1;

Figure 13:
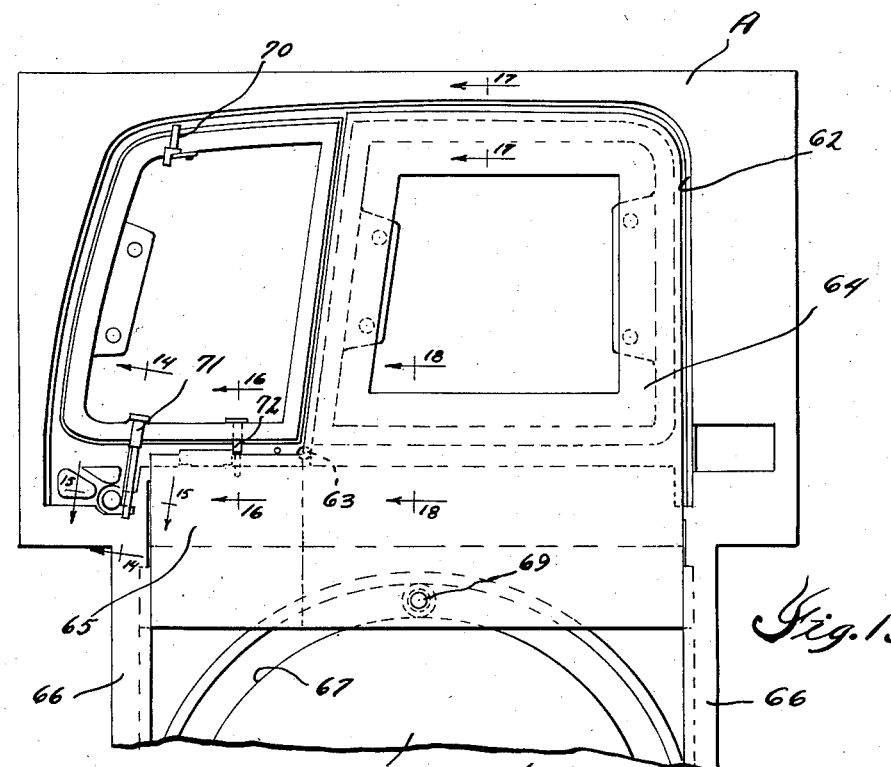
Figure 13 is a fragmentary elevational view of one-half of the die taken substantially on the plane indicated by line 13—13 of Figure 12.
Figure 19:
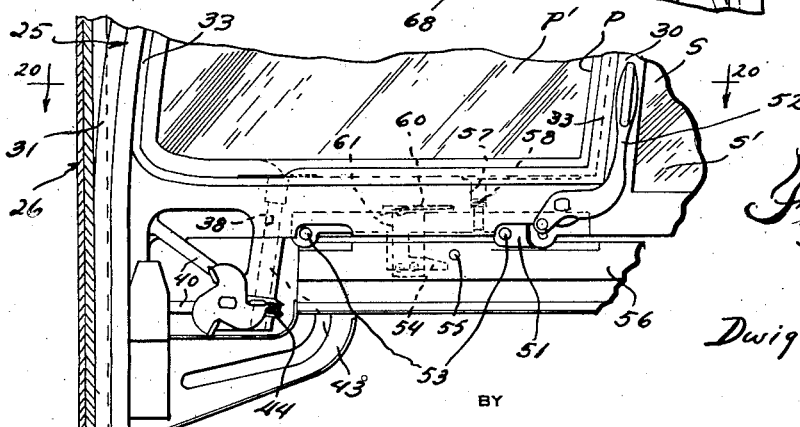
Figure 14:
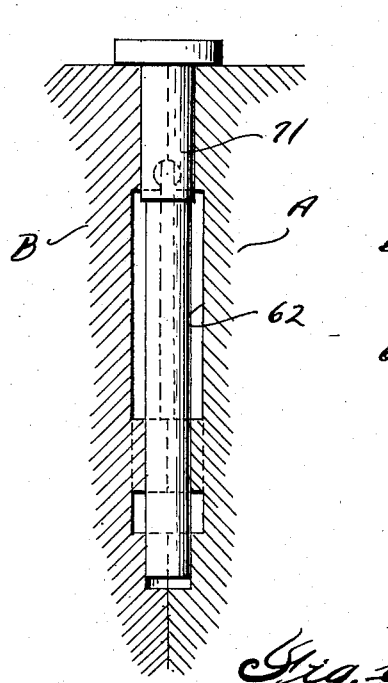
Figure 16:
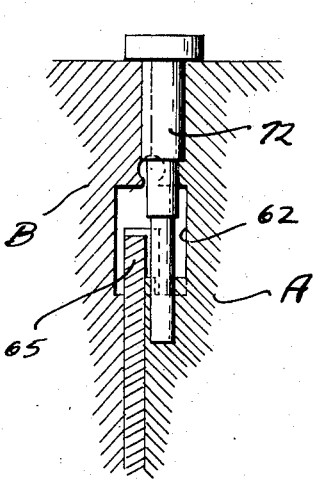
Figure 18:
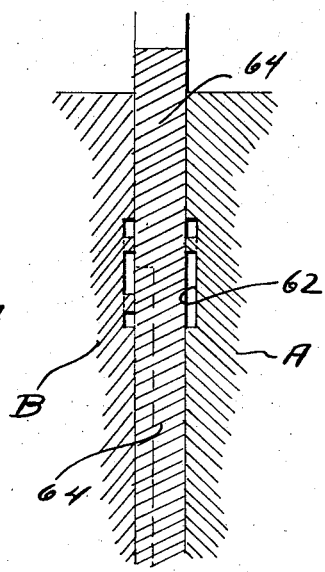
Figure 17:
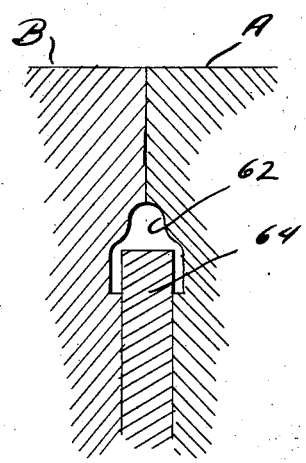
Figure 15:
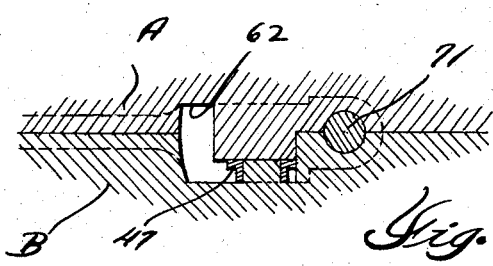
Figure 20:
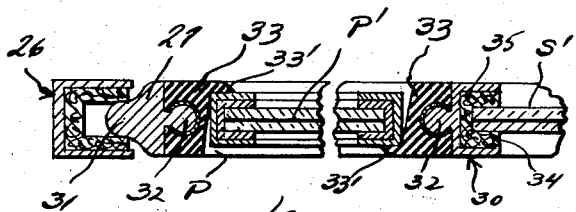

Figures 14 to 18 inclusive are enlarged fragmentary sectional elevational views taken substantially on the planes indicated by lines 14—14, 15—15, 16—16, 17—17 and 18—18 respectively of Figure 13;

Figure 19 is a sectional elevational view of a portion of my ventilating window construction showing my improved frame together with the associated operating mechanism, and Figure 20 is a fragmentary sectional view taken substantially on the plane indicated by line 20—20 of Figure 19.

As described in my copending application heretofore referred to, my improved type of ventilating window comprises a frame 25 adapted to be raised and lowered into and out of registration with the usual window opening, being guided in its vertical sliding movement by means of the usual or conventional guide channels 26 (see Figures 19 and 20). The frame 25 supports a pivoted panel pivoted intermediate its vertical edges and also provides supports and guides for a sliding panel which cooperates with the pivoted panel to form a composite closure for closing the window opening.

The frame 25 is also provided with means for mounting the pivoted panel operating mechanism and with control means selectively operable to couple the frame with a fixed part of the window casing or door structure or to couple the same with the window lifter mechanism whereby the frame, together with the pivoted panel and the sliding panel, may be raised and lowered by this window lifter mechanism.

As heretofore mentioned, it is proposed, in accordance with this invention, to form the frame 25 as an integral one-piece construction, preferably by die casting. In the commercially practical embodiment of the invention herein illustrated, the several varying cross sections of the frame have been shown and may be referred to in detail. However, it will become readily apparent as this description proceeds that many detailed features of this invention may be referred to without any intent to thereby limit the invention.

By reference to Figure 1, it will be noted that the frame therein illustrated has a periphery which is substantially inverted U-shape thus providing a pair of substantially vertical legs or sides 27 and a top portion or section 28 which constitutes the base of the inverted U-shape. Extending between the sides or legs 27 is a transverse frame member 29 and extending vertically between the transverse frame member 29 and the top frame portion 28 is a vertically extending frame portion 30.

The pivoted panel is adapted to be mounted within the opening P of the frame and the sliding panel is adapted to close the opening S of the frame. The vertical leg 27 at the left of Figure 1 is preferably of the cross section illustrated in Figure 9 and is cast with a rib 31 adapted to slide in the conventional channel 26 heretofore referred to and with a bead or rib 32 on the inner face thereof adapted to receive and support a weatherstrip 33 in the manner suggested, for instance, in Figure 20.

The other vertical side of the opening P which is defined by the frame member 30 is preferably cast with a cross section such as illustrated in Figure 8, the same being formed with a bead or rib 32 to receive a weatherstrip 33 companion to the first weatherstrip and with a channel portion 34 to slidably receive and support the edge of the sliding panel S', see Figure 20. A felt channel member 35 is usually interposed between the sliding panel S' and the channel portion 34 of this frame member 30.

The upper frame member 28 is formed throughout its outer face with a rib 36 similar to the rib 31 which rib 36 enters the channel (not shown) usually provided against the top of the conventional window opening. The inner face of that portion of the upper frame member 28 located to the right of the frame member 30 in Figure 1 is provided with a channel portion 34' companion to the previously mentioned channel 34, a channel portion 34 being also provided in the inner face of the frame member 27 at the right of Figure 1. Thus the opposed channel portions 34 slidably receive and support the sliding panel S', the upper edge of this sliding panel engaging the channel portion 34' of the frame member 28 in its fully raised position. The right hand frame member 27 is also provided on its outer face with a rib 31 companion to the rib 31 previously referred to, these rib portions slidably engaging the conventional channels 26 to support the frame for vertical sliding movement.

In forming the frame a pivot bearing opening or recess 37 is cast in the inner face of the upper frame member 28 and an aligned cooperating bore or opening 38 is provided extending through the lower frame member 29, see particularly Figures 1 and 3. These recesses or openings 37 and 38 constitute the bearings for the pivots of the pivoted panel P' and by forming these openings when the frame is cast they are not only properly positioned but are accurately aligned.

Adjacent the portion of the frame formed with the bore 38 is a gear housing or support consisting of a housing 39 and connecting webs or arms 40. Projecting from the gear housing 39 is a portion 41 formed with a bore or opening 42 arranged in alignment with the bore 38.

The aligned openings 38 and 42 are adapted to receive and rotatably support a pivoted panel operating shaft 43, see Figure 19, which carries the worm wheel 44, the latter being arranged in the space 45 between the spaced bore portions 38 and 42. The worm which meshes with the worm wheel 44 is rotatably supported in the housing 39, one end of the shaft of the worm (not shown) extending through the opening 46 cast in the side of the housing 39. As shown, a bearing sleeve 47 may be cast around the bearing opening 46.

From a comparison of Figure 1 with Figures 3 to 11 inclusive, it will be apparent that the rib 31—36—31 is provided on the outer periphery of the frame throughout the U-shaped portion thereof, and that the weatherstrip supporting bead 32 is provided substantially throughout the inner periphery of that portion of the frame which defines the opening P. The inner periphery of that portion of the frame which defines the sides and top of the opening S is provided with the channel 34—34'. The frame portion 29 which defines the lower side of this opening S is substantially in the form of spaced parallel plates, as seen most clearly in Figure 6. However, in casting this portion of the frame a plurality of openings 48 may be provided by means of which weatherstrips in the form of pile fabric strips may be attached to the inner opposed faces thereof, and one or more slots 49 may also be formed to accommodate support actuating elements designed to pass from within a portion of this frame to a position adjacent one of the outer faces thereof.

That portion of the frame 29 to the left of the vertical frame member 30 is cast with a longitudinally extending slot 50 to receive and slidably support a control bar described and illustrated more in detail in my aforementioned copending application. This control bar is illustrated at 51 in Figure 19 and is adapted to be shifted longitudinally by means of an operating handle 52. This control bar carries a plurality of pins or the like 53 adapted to engage fixed supports (not shown) on the window casing or stationary part of the door for securing the frame 25 in position in registration with the window opening. The bar 51 also carries a hook-shaped member 54 adapted to engage a pin 55 on the glass retainer element 56 of the conventional window lifter mechanism whereby when the bar 51 is shifted in one direction by the handle 52 the frame 25 will be coupled with the window lifter mechanism so as to be capable of being raised and lowered thereby.

By reference to Figure 11, it will be noted that the frame is also cast with a vertically extending passageway or opening 57 which receives an element 58 actuated by the pivoted panel P' and acting to prevent operation of the slide bar 51 and as a consequence the handle 52 unless the pivoted panel P' is in proper position. The frame is also cast with a recess 59 communicating with the slot 50 in which a resilient element 60 is located normally acting on the slide bar 50 to prevent longitudinal movement thereof but releasable by means of a member 61 carried by the retainer 56 when the retainer member 56 is in its uppermost position. The structure and operation of these last mentioned elements is fully described in my aforementioned pending application and need not be referred to in detail herein.

As previously mentioned, my improved frame may be conveniently formed by die casting and by reference to Figures 12 to 18 inclusive, one form of means for producing the frame will be described.

Figure 12:
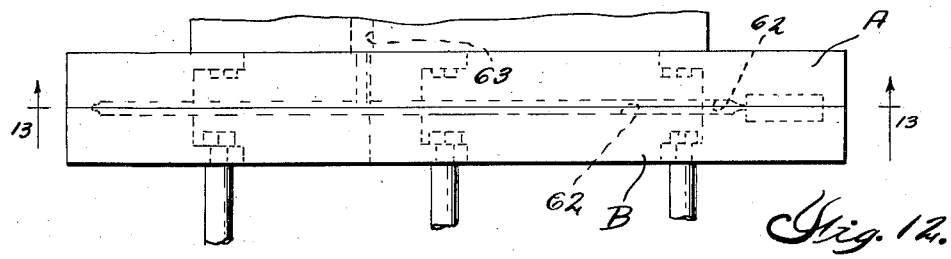
Figure 12 is a fragmentary end or top elevational view of a casting die by means of which my improved frame may be produced.

In Figure 12 there is illustrated what may be for convenience termed the stationary and movable die sections A and B of a die casting machine. As usual these sections are respectively formed with cavities 62 shaped to produce the work piece or frame, the material being introduced into the die through an opening 63.

In order to form the space 29' between the spaced plate-like portions of the frame 29 and for forming the channels 34 and 34', a core piece 64 is employed which is insertable between the die sections and cooperates therewith to produce the cross sections illustrated in Figures 6, 7, 8 and 10. This movable or slidable core piece is also provided with a lateral extension 65 which produces the slot 50 and recess 59. The slidable core piece 64—65 may be guided by guideways 66 and operated by an eccentric camway 67 in a cam wheel 68, a pin 69 carried by the core piece being engageable in the camway 67.

The pivot bearing recess 37 is produced by a removable core pin or insert 70. The aligned bores or passages 38—42 are produced by a removable core pin 71, and the opening 57 is produced by removable core pin 72, compare Figures 13, 14 and 16. The die adjacent the core pins 70, 71 and 72 is cut away so that these core pins may be removed.

As previously described, it is preferable that a bearing sleeve 47 be cast around the opening 46 of the gear housing 39.

It is obvious that with an arrangement such as herein described the die casting operation is relatively simple inasmuch as the slidable core member 64—65 may be withdrawn, and upon separation of the die sections A and B the core pins 70, 71 and 72 can be withdrawn whereupon the casting may be removed.

With a die cast frame such as herein described, the pivots for the pivoted panel are accurately aligned with one another and with the gear housing or support so that the need of accurate assembly of this part of the structure is eliminated. This obviously is extremely beneficial in quantity production and accordingly materially reduces the cost of production and assembly. Moreover, the relative position of the slide bar receiving slot together with the passageway 57, recess 59, slots 49 and openings 48 is uniform in each frame produced thus effecting a further economy in production and assembly. In addition, the necessity for welding joints which require finishing is done away with. Finally, the number of separate parts requiring assembly is reduced to a minimum.

As heretofore pointed out, one commercially practical embodiment of the invention has been illustrated and described somewhat in detail, but it is not intended that the scope of this invention should be unduly limited thereby. Accordingly, reservation is made to make such changes in all of the non-essential details of the invention as may come within the purview of the accompanying claims.

What I claim as my invention is:

1. An integral one-piece window frame insertable into a window opening of a vehicle body and having top, bottom and side bars, and an intermediate bar extending between the top and bottom bars dividing the space defined by the frame into two window panel receiving openings, said top and bottom bars having aligned pivot receiving recesses formed therein between the intermediate bar and one of the side bars to provide for pivotally supporting a window panel in one of said openings, and said bottom bar having a gear housing formed integral therewith in predetermined relation to the pivot recess in the bottom bar.

2. An integral one-piece window frame insertable into a window opening of a vehicle body and having top, bottom and side bars, said top and bottom bars having aligned pivot receiving recesses formed therein to provide for pivotally supporting a window panel, one of said bars having a gear housing formed integrally therewith in predetermined relation to one of said pivot recesses.

DWIGHT B. LEE.